United States Patent [19]

Ebert et al.

[11] Patent Number: 5,684,062
[45] Date of Patent: Nov. 4, 1997

[54] (CO)POLYCARBONATES STABILISED AGAINST γ-RADIATION

[75] Inventors: Wolfgang Ebert, Krefeld; Ralf Hufen, Duisburg; Rüdiger Schubart, Gladbach; Gerhard Fennhoff, Willich, all of Germany

[73] Assignee: Bayer AG, Leverkusen, Germany

[21] Appl. No.: 639,182

[22] Filed: Apr. 26, 1996

[30] Foreign Application Priority Data

May 8, 1995 [DE] Germany .................. 195 16 787.2

[51] Int. Cl.⁶ ...................................... G21F 1/10
[52] U.S. Cl. ............................... 523/136; 524/83
[58] Field of Search ..................... 524/83; 523/136

[56] References Cited

U.S. PATENT DOCUMENTS

| | | | |
|---|---|---|---|
| 3,193,520 | 7/1965 | Caldo | 524/83 |
| 4,135,028 | 1/1979 | Hiestand et al. | 524/83 |
| 4,782,103 | 11/1988 | Ogoe . | |
| 4,880,855 | 11/1989 | Nelson et al. | 524/167 |
| 4,996,247 | 2/1991 | Nelson et al. | 524/136 |
| 5,118,726 | 6/1992 | Mitutani et al. | 523/136 |
| 5,354,556 | 10/1994 | Sparks et al. . | |

FOREIGN PATENT DOCUMENTS

| | | |
|---|---|---|
| 37 43 136 | 1/1988 | European Pat. Off. . |
| 0 374 816 | 6/1990 | European Pat. Off. . |
| 0 376 289 | 7/1990 | European Pat. Off. . |
| 58-79034 | 5/1983 | Japan ............................ 524/83 |

OTHER PUBLICATIONS

Derwent Database, SU 1 558 939 (Apr. 23, 1990).

*Primary Examiner*—Veronica P. Hoke
*Attorney, Agent, or Firm*—Connolly and Hutz

[57] ABSTRACT

The present invention relates to polycarbonate molding compositions containing polycarbonates, stabilizers of general formula

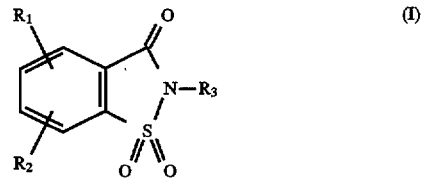

and optionally polypropylene glycols.

The present invention also relates to the use of these molding compositions for the production of articles for medical applications.

7 Claims, No Drawings

(CO)POLYCARBONATES STABILISED AGAINST γ-RADIATION

This invention relates to (co)polycarbonates stabilised against the discolouration effect of β, γ-radiation, which are based on diphenols and one or more stabilisers.

The invention relates to polycarbonate moulding compositions containing a) 97.5% by weight to 99.9% by weight of a polycarbonate or copolycarbonate, and b) 0.01% by weight to 2.5% by weight of a β,γ-stabiliser of general formula (I), with respect to 100% by weight of a)+b) in each case

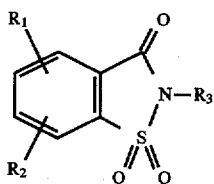

where $R_1$ and $R_2$ represent, independently of each other, H, $C_1$–$C_{36}$ alkyl groups which are optionally branched, preferably $C_1$–$C_{12}$ alkyl or alkoxy groups which are optionally branched, $C_7$–$C_{18}$ alkylaryl radicals or aralkyl radicals which are optionally branched and/or substituted, or $C_6$–$C_{18}$ aryl radicals which are optionally substituted, or where two $R_1$ and $R_2$ radicals represent an aromatic ring which is incorporated by condensation and which is optionally substituted, and where $R_3$ has the meanings given for $R_1$, but most preferably represents H, methyl, benzyl or phenyl.

The polycarbonate moulding compositions according to the invention may contain, as an additional stabiliser, c): 0.01% by weight to 3.5% by weight, preferably 0.1% by weight to 2.0% by weight, of polypropylene glycol which is optionally terminally blocked and which has an average molecular weight of 250 to 10,000, preferably 500 to 5000, wherein the percentages by weight of c) relate to 100% by weight of a)+b) in each case.

Prior art stabilisation against γ-radiation consists of treating the polycarbonate with oligomeric polypropylene glycols (EP 376 289), oligomeric brominated bisphenol A-polycarbonates (EP 114 973), blends of polycarbonate and polyesters based on terephthalic acid and cyclohexanedimethanol (EP 152 012), or organic disulphides, optionally in combination with oligomeric polypropylene glycols in each case.

Examples of the disadvantages associated with these stabilisers include: for polypropylene glycol on its own, insufficient stabilisation at high radiation dosages; for brominated systems, inadequate useability due to the halogen content; when using polyester blends, inadequate capability for sterilisation by hot steam; and for disulphide systems, the small processing window before decomposition occurs.

The object of the present invention was therefore to develop an additive system which is stable under production and processing conditions, which results in mouldings which can be sterilised by hot steam in order to ensure universality of use, in which no halogen-containing stabilisers are used, and which ensures satisfactory stabilisation under irradiation at 5 Mrad.

This object has been achieved by the addition according to the invention of stabiliser (I).

Suitable diphenols for the production of the polycarbonates to be used according to the invention are those of general formula (II)

$$HO-Z-OH \quad (II),$$

which preferably contain 6 to 30 C atoms, and which comprise both mononuclear and polynuclear diphenols which may contain heteroatoms and which may contain substituents which are inert under the conditions of polycarbonate production and under conditions of the thermal irradiation of polycarbonates.

The following may be cited by way of example: hydroquinone, resorcinol, dihydroxydiphenyl, bis-(hydroxyphenyl)-alkanes, bis-(hydroxyphenyl)-cycloalkanes, bis-(hydroxyphenyl) sulphides, -ethers, -sulphoxides, -sulphones and α, α-bis-(hydroxyphenyl)-diisopropylbenzenes, as well as compounds thereof comprising alkylated nuclei and halogenated nuclei.

Examples of suitable diphenols are described in U.S. Pat. Nos. 3,028,365, 2,999,835, 3,062,781, 3,148,172 and 4,982,014, in German Offenlegungsschriften 1 570 703 and 2 063 050, and in the monograph by H. Schnell, "Chemistry and Physics of Polycarbonates", Interscience Publishers, New York, 1964.

Preferred diphenols include 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, αα-bis-(4-hydroxyphenyl)-p-diisopropylbenzene, α,α-bis-(4-hydroxyphenyl)-m-diisopropylbenzene, 2,2-bis-(3-methyl-4-hydroxyphenyl)-propane, 2,2-bis(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropylbenzene, 1,1-bis-(4-hydroxyphenyl)-3,3,5-trimethylcyclohexane, 1,1-bis-(4-hydroxyphenyl)-3-methylcyclohexane, 1,1-bis-(4-hydroxyphenyl)-3,3dimethylcyclohexane, 1,1-bis-(4-hydroxyphenyl)-4-methylcyclohexane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-1-phenyl-ethane, 2,2-bis-(3,5-dimethyl-4-hydroxyphenyl)-2-phenyl-ethane, 2,2-bis-(4-hydroxyphenyl)-2,2-diphenyl-ethane, 9,9-bis-(4-hydroxyphenyl)-fluorene, and 9,9-bis-(3,5-dimethyl-4-hydroxyphenyl)-fluorene.

Examples of particularly preferred diphenols include 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(4-hydroxyphenyl)-1-phenyl-ethane, 1,1-bis-(4-hydroxyphenyl)-3,3,5-trimethylcyclohexane, 1,1-bis-(4-hydroxyphenyl)-3-methylcyclohexane, 1,1-bis-(4-hydroxyphenyl)-4-methylcyclohexane, and 9,9-bis-(3,5-dimethyl-4-hydroxyphenyl)fluorene.

2,2-bis-(4-hydroxyphenyl)-propane, 1,1-bis-(4-hydroxyphenyl)-3,3,5-trimethylcyclohexane and 1,1-bis-(4-hydroxyphenyl)-1-phenylethane are most particularly preferred.

Any mixtures of the aforementioned diphenols may also be used.

For the purpose of improving the flow behaviour, small amounts, preferably amounts between 0.05 and 2.0 mole % (with respect to the moles of diphenols used) of trifunctional compounds, or compounds with a functionality greater than three, particularly those containing three or more than three phenolic groups, are used in combination in the known manner during the synthesis. Examples of some of the compounds which may be used comprise 1,3,5-tris-(4- hydroxyphenyl)-benzene, 1,3,5-tris-(4-(4-hydroxyphenylisopropyl)-phenyl)-benzene, 1,1,1-tris-(4-hydroxyphenyl)-ethane, 2,6-bis-(2-hydroxy-5'-methyl-benzyl)-4-methylbenzene, 2-(4-hydroxy-phenyl)-2-(2,4-dihydroxyphenyl)-propane, hexakis-(4-(4-hydroxyphenylisopropyl)-phenyl)-orthoterephthalic acid ester, tetrakis-(4-hydroxyphenyl)-methane, 1,1-bis-((4', 4"dihydroxytriphenyl)-methyl)-benzene, 3,3-bis-(4-hydroxyphenyl)-2-oxo-2,3-dihydroindole, and 3,3-bis-(4-hydroxy-3-methyl-phenyl)-2-oxo-2,3-dihydroindole. Also suitable are the chlorocarboxylic acid esters corresponding to these compounds, and the acids or preferably the acid chlorides of aliphatic or aromatic carboxylic acids of basicity greater than 2, namely 2,4-dihydroxybenzoic acid or 2,4-dihydroxybenzoic acid chloride, trimesic acid or trimesic acid chloride, trimellitic acid or trimellitic acid chloride, or cyanuric acid trichloride, for example, wherein these branching agents may be used in the batch individually or in admixture, or may be added to the synthesis in portions.

Phenols, optionally substituted phenols, or chlorocarboxylic acid esters thereof, or monocarboxylic acids and the acid chlorides thereof, preferably cumylphenol, phenol, tert.-butylphenol and i-octylphenol, may be used as chain terminators, optionally as mixtures, and with the usual impurities and isomers, wherein the chain terminators can be used individually or in admixture with the diphenols in the batch, or may be added to the synthesis in portions.

The polycarbonates or polycarbonate mixtures to be used according to the invention can essentially be produced by the following three known methods (see H. Schnell, "Chemistry and Physics of Polycarbonates", Polymer Review, Vol. IX, page 27 et seq., Interscience Publishers, New York, 1964):

1. By the solution process in a dispersed phase, the so-called "two-phase phase transfer process"
2. By the solution process in a homogeneous phase, also called the "pyridine process".
3. By the melt transesterification process.

The polycarbonates to be used according to the invention have weight average molecular weights Mw (determined by measuring the relative viscosity in $CH_2Cl_2$ at 25° C. and at a concentration of 0.5 g in 100 ml $CH_2Cl_2$) between 10,000 and 80,000, preferably between 15,000 and 40,000.

The usual additives for thermoplastic polycarbonates, such as stabilisers, e.g. thermal stabilisers such as organic phosphites, optionally in combination with monomers or oligomeric epoxides for example, UV stabilisers, particularly those based on nitrogen-containing heterocycles such as triazoles, optical brighteners, flame retardants, particularly flame retardants containing fluorine, such as the perfluorinated salts of organic acids, polyperfluoroethylene, or salts of organic sulphonic acids and combinations thereof, and optionally other demoulding agents, colorants, pigments, antistatic agents, fillers and reinforcing agents, made be added in the usual amounts to the polycarbonate moulding compositions according to the invention, before, during or after the processing of the latter.

Stabilisers (I) are known from the literature (see Römpp "Lexikon der Chemie" ["*Dictionary of Chemistry*"], Sixth Edition, page 3952, for example) or can be obtained by methods known from the literature (see Ullmann: Fourth Edition, Vol. 22, page 357; or U.S. Pat. No. 667,503 (1951)).

Examples thereof include saccharin, and also the N-methyl, N-ethyl, n-i/n-propyl, N-i/n/neo/tert.-butyl, N-/n/ i-pentyl, N-cyclohexyl, N-cyclopentyl, N-phenyl and N-benzyl derivatives of saccharin, and also

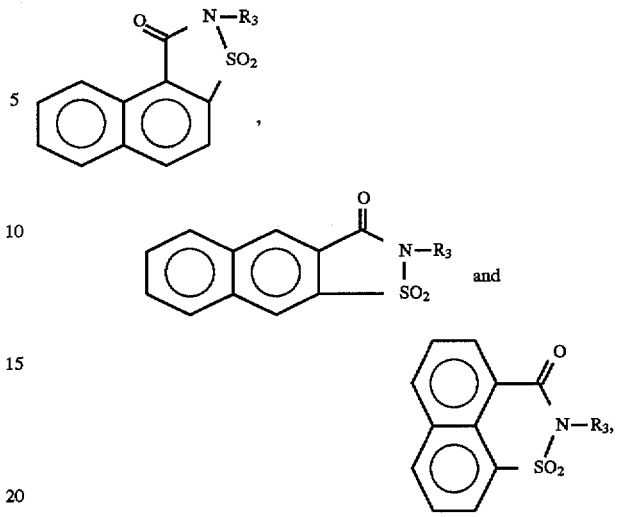

where $R_3$ may represent H, $CH_3$, —$C_2H_5$, i/n-propyl, i/n/neo/tert.-butyl, n/i-pentyl, cyclohexyl, cyclopentyl, phenyl or benzyl.

Saccharin, and N-methyl-, N-phenyl- and N-benzylsaccharin are preferred. Saccharin, N-methyl- and N-phenylsaccharin are quite particularly preferred.

The said stabilisers are used individually or as any mixtures, in concentrations of 0.01% by weight to 2.5% by weight, wherein the addition may be effected in the absence of solvent, as a powder or melt, or as a solution, before or during the work-up of the polycarbonate resin, or also in a subsequent compounding step.

In this respect it may be advantageous if the moulding compositions also contain, in addition to the said stabilisers, polypropylene glycols in amounts of 0.1% by weight to 3.5% by weight, preferably 0.25% by weight to 2.0% by weight, optionally polypropylene glycol which is terminally blocked, with an average molecular weight of 250 to 10,000, preferably 500 to 5000. Polypropylene glycols of this type are known from the literature. In order to eliminate light yellow colorations which may occasionally arise, it is useful under some circumstances to treat the moulding compositions in addition with the phosphorus-containing stabilisers which are customary for polycarbonate.

The polycarbonates according to the invention can be processed to form mouldings, for example by extruding the polycarbonates, which are isolated in the known manner, to form a granular material, and by processing this granular material by injection moulding, optionally after incorporating the aforementioned additives, to form various articles in the known manner.

The polycarbonates according to the invention can be used whereever the polycarbonates are used which were hitherto known for this purpose, but particularly in the medical range of applications, namely for dialyser housings, for example.

The present invention thus also relates to the use of the polycarbonate moulding compositions according to the invention for the production of articles for medical applications.

For what are mostly non-transparent applications, other thermoplastics may also be mixed with the polycarbonates according to the invention, in the usual amounts, i.e. between 10% by weight and 50% by weight with respect to the polycarbonate according to the invention.

Examples of other suitable thermoplastics include aromatic polyester carbonates, polycarbonates based on bisphenols other than those of the polycarbonates according to the invention, polyalkylene terephthalates, EDPM polymers, polystyrene, and copolymers and graft copolymers based on styrene, such as ABS in particular.

EXAMPLES

In order to produce test samples, an unstabilised polycarbonate free from additives, with an average molecular weight of about 30,000 (Mw determined by GPC) and with a solution viscosity $\eta=1.293$ at 300° C., was compounded in a twin-shaft extruder with the given amount of stabiliser and then granulated. Colour sample panels (thickness 4 mm) were then injection moulded from this granular material. The yellowness index of these panels was determined before irradiation (Hunter-Lab instrument). These test samples were then irradiated (Dose: 5 Mrad, Co tube), stored for 10 days in the dark, and the YI was determined again. The value $YI_{diff}$, which was used for evaluation, was determined from the difference between the two measurements, namely before and after irradiation.

a) Comparative Tests

| Compound | Concn. (% by weight) | $YI_{initial}$ | $YI_{irrad}$ | $YI_{diff}$ |
|---|---|---|---|---|
| Polycarbonate$_{re-extr.}$ | — | 6.31 | 48.88 | 42.57 |
| | — | 6.27 | 48.07 | 41.80 |
| Polypropylene glycol | 0.75 | 4.58 | 29.24 | 24.66 |
| | 0.75 | 4.70 | 30.07 | 25.37 |
| Distearyl sulphide | 0.50 | 10.47 | 25.93 | 15.46 |
| | 0.50 | 10.16 | 25.70 | 15.54 | b) According to the Invention

| Compound | Concn. (% by weight) | $YI_{initial}$ | $YI_{irrad}$ | $YI_{diff}$ |
|---|---|---|---|---|
| Example 1: | | | | |
| Saccharin | 0.5 | 4.2 | 18.3 | 14.1 |
| Saccharin | 0.5 | 4.2 | 18.2 | 14.0 |
| Example 2: | | | | |
| Saccharin | 0.25 | 3.9 | 20.7 | 16.8 |
| Saccharin | 0.75 | 3.9 | 20.1 | 16.2 |

Two different colour sample panels were measured in each test to ensure certainty of measurement. All test samples contained 0.75% by weight of polypropylene glycol, of molecular weight about 2000.

We claim:

1. A method of making a polycarbonate moulding composition resistant to high energy $\beta,\gamma$-radiation, which comprises adding to a polycarbonate from 0.01% by weight to 2.5% by weight, based on weight of polycarbonate, of a stabilizer of formula (I)

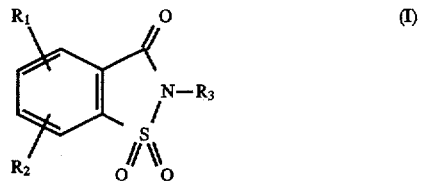

wherein $R_1$ and $R_2$ represent, independently of each other, H, $C_1-C_{36}$ alkyl groups which are optionally branched, $C_7-C_{18}$ alkylaryl radicals or aralkyl radicals which are optionally branched and/or substituted, or $C_6-C_{18}$ aryl radicals which are optionally substituted, or where two $R_1-R_2$ radicals represent an aromatic ring which is incorporated by condensation and which is optionally substituted, and where $R_3$ has the meanings given for $R_1$, or of a stablizer of the formula (Ia)

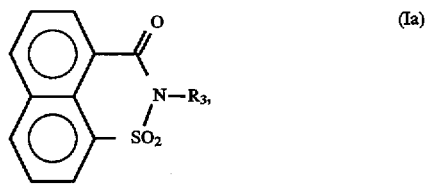

wherein $R_3$ is defined as above for formula (I), and exposing the molding compound to $\beta,\gamma$-radiation.

2. The method of claim 1, wherein the stabiliser is saccharine.

3. The method of claim 1, wherein the stabiliser is N-methylsaccharin.

4. The method of claim 1, wherein the stabiliser is N-phenylsaccharin.

5. The method of claim 1, wherein the polycarbonate moulding composition additionally contains 0.1% by weight to 3.5% by weight of polypropylene glycols, optionally containing blocked terminal groups, with an average molecular weight of 250 to 10,000.

6. The method of claim 1, wherein the polycarbonates have been synthesized based on 2,2-bis-(4-hydroxyphenyl) -propane, 1,1-bis-(4-hydroxyphenyl)-3,3,5-trimethylcyclohexane and 1,1-bis-(4-hydroxyphenyl)1-phenylethane or mixtures thereof.

7. The method of claim 1, wherein the polycarbonate moulding composition is stabilised under irradiation of 5M rad.

* * * * *